United States Patent
Larson

(10) Patent No.: US 10,125,685 B2
(45) Date of Patent: Nov. 13, 2018

(54) METHOD AND SYSTEM FOR COOLING DOWN A GAS TURBINE

(71) Applicant: Siemens Aktiengesellschaft, Munich (DE)

(72) Inventor: Marco Larson, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/524,341

(22) PCT Filed: Nov. 6, 2015

(86) PCT No.: PCT/EP2015/075890
§ 371 (c)(1),
(2) Date: May 4, 2017

(87) PCT Pub. No.: WO2016/078932
PCT Pub. Date: May 26, 2015

(65) Prior Publication Data
US 2017/0314472 A1   Nov. 2, 2017

(30) Foreign Application Priority Data

Nov. 18, 2014  (EP) ..................................... 14193607

(51) Int. Cl.
| | |
|---|---|
| F02C 7/143 | (2006.01) |
| F02C 3/04 | (2006.01) |
| F02C 7/042 | (2006.01) |
| F02C 9/20 | (2006.01) |
| F02C 7/18 | (2006.01) |
| F01D 21/00 | (2006.01) |

(52) U.S. Cl.
CPC .............. *F02C 7/143* (2013.01); *F01D 21/00* (2013.01); *F02C 3/04* (2013.01); *F02C 7/042* (2013.01);
(Continued)

(58) Field of Classification Search
CPC .. F02C 7/143; F02C 7/185; F02C 9/20; F02C 7/042; F02C 3/04; F01D 21/00;
(Continued)

(56) References Cited

U.S. PATENT DOCUMENTS

| | | | | |
|---|---|---|---|---|
| RE39,092 E | * | 5/2006 | Horii ..................... | F02C 7/1435 60/39.53 |
| 7,293,415 B2 | * | 11/2007 | Hoffmann ............... | F02C 7/057 60/39.27 |

(Continued)

FOREIGN PATENT DOCUMENTS

| | | |
|---|---|---|
| DE | 102012224009 A1 | 6/2014 |
| EP | 2365197 A1 | 9/2011 |

(Continued)

OTHER PUBLICATIONS

EP Search Report dated May 4, 2015, for EP patent application No. 14193607.0.

(Continued)

*Primary Examiner* — Ted Kim
(74) *Attorney, Agent, or Firm* — Beusse Wolter Sanks & Maire

(57) ABSTRACT

A method for cooling down a gas turbine, wherein the gas turbine is run down from the power operation thereof to cool-down operation, and wherein a liquid is sprayed into air sucked in by a compressor of the gas turbine during the cool-down operation, and wherein the liquid is sprayed into the sucked-in air in dependence on a humidity of the sucked-in air, a flow velocity of cooling air flowing in the gas turbine in the region of at least one flow-guiding component of the gas turbine, which component is to be cooled, and a temperature difference between a temperature of the sucked-in air and a temperature of the at least one flow-guiding component of the gas turbine.

8 Claims, 1 Drawing Sheet

(52) U.S. Cl.
CPC ................ *F02C 7/185* (2013.01); *F02C 9/20* (2013.01); *F05D 2220/32* (2013.01); *F05D 2260/212* (2013.01); *F05D 2270/303* (2013.01); *F05D 2270/311* (2013.01)

(58) Field of Classification Search
CPC ......... F05D 2270/303; F05D 2270/311; F05D 2220/32; F05D 2260/212
See application file for complete search history.

(56) References Cited

U.S. PATENT DOCUMENTS

| | | | |
|---|---|---|---|
| 2002/0083712 A1* | 7/2002 | Tomlinson | F01D 17/08 60/775 |
| 2007/0251210 A1 | 11/2007 | Huelfenhaus et al. | |
| 2010/0189551 A1* | 7/2010 | Ballard, Jr. | F01D 11/24 415/175 |
| 2011/0214430 A1 | 9/2011 | Pauli et al. | |
| 2015/0068213 A1* | 3/2015 | Lomas | F02C 7/12 60/772 |

FOREIGN PATENT DOCUMENTS

| | | | |
|---|---|---|---|
| WO | 2006021520 A1 | 3/2006 | |
| WO | 2014095237 A1 | 6/2014 | |

OTHER PUBLICATIONS

International Search Report dated Mar. 7, 2016, for PCT/EP2015/075890.

* cited by examiner

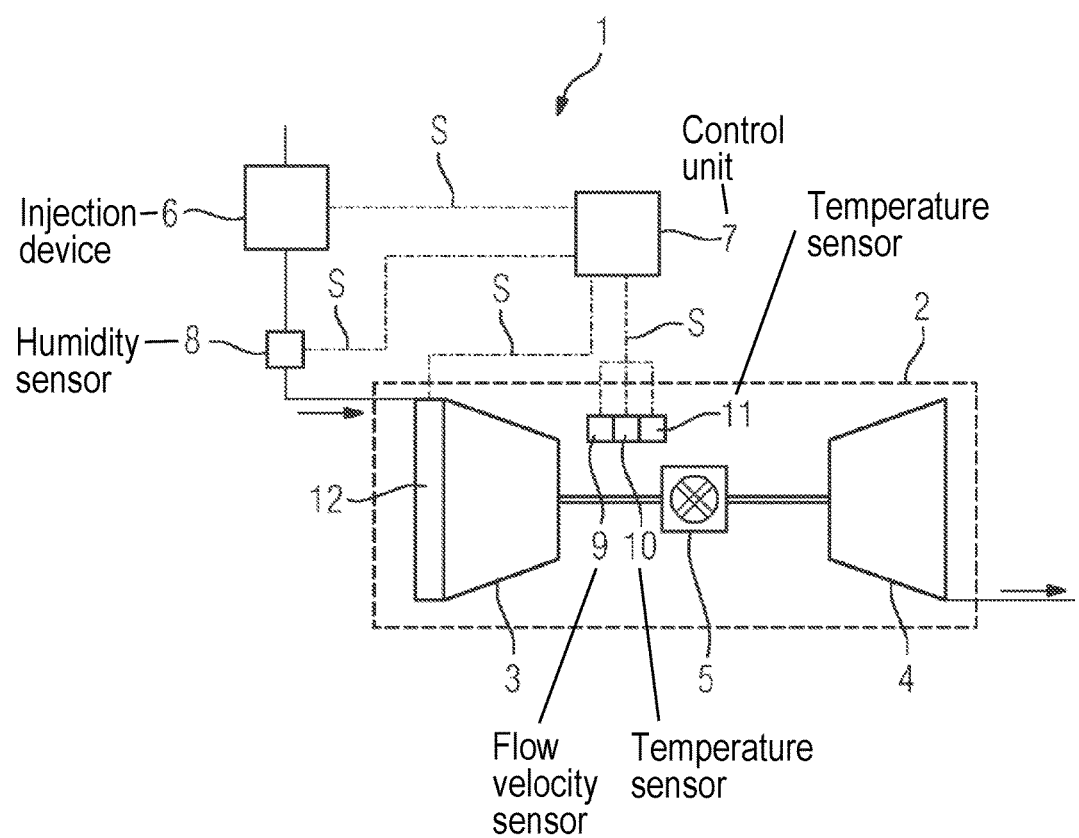

METHOD AND SYSTEM FOR COOLING DOWN A GAS TURBINE

CROSS REFERENCE TO RELATED APPLICATIONS

This application is the US National Stage of International Application No. PCT/EP2015/075890 filed Nov. 6, 2015, and claims the benefit thereof. The International Application claims the benefit of European Application No. EP14193607 filed Nov. 18, 2014. All of the applications are incorporated by reference herein in their entirety.

FIELD OF INVENTION

The invention relates to a method and to a system for cooling down a gas turbine.

BACKGROUND OF INVENTION

To enable a gas turbine to be inspected and serviced, the gas turbine must first of all be run down from the power mode thereof and cooled down for a sufficiently long time. Inspection and servicing work can begin on completion of an appropriate cooling-down process of the gas turbine, which in some cases can take approximately twenty-four hours. During the cooling-down process, the gas turbine is not available for its intended use.

It is therefore technically desirable to shorten the length of a cooling-down process of a gas turbine and thereby to increase availability of the gas turbine.

One technical approach to a solution for this problem is taught by WO 2006/021520 A1, according to which a liquid is introduced into the compressor during the cooling down of the gas turbine by adding the liquid to the air flow ahead of the compressor.

However, the fact that an excessive addition of liquid can cause damage to the hot components of the gas turbine due to excessive temperature gradients can have a disadvantageous effect according to the prior art. Stress damage of this kind can occur especially with very thick-walled components.

SUMMARY OF INVENTION

Thus, an object is to avoid such disadvantages known from the prior art. In particular, therefore, the intention is thereby to avoid stress damage due to excessive temperature gradients across the components of the gas turbine.

This object is achieved by the independent claims. Advantageous embodiments are given, in particular, in the dependent claims, which can each represent one aspect of the invention taken individually or in various combinations.

According to the method according to the invention for cooling down a gas turbine, the gas turbine is run down from the power mode thereof to a cool-down mode, and, as already known from the prior art, a liquid is injected into air sucked in by a compressor of the gas turbine during the cool-down mode.

Injecting liquid into the air sucked in by the compressor during the cool-down mode of the gas turbine increases the air humidity and the mass of the compressor air volume flow, thereby allowing the compressor air volume flow to absorb a larger quantity of heat from the components of the gas turbine as it flows through the gas turbine. It is thereby possible to cool down the gas turbine more quickly. As a result, inspection and servicing work on the cooled-down gas turbine can begin more quickly. At the same time, the gas turbine is available again more quickly for power production.

To inject the liquid, e.g. water or deionized water, into the air sucked in by the compressor, it is possible to make use of a device which is usually already present, by means of which liquid can be injected into the air sucked in by the compressor during the power mode of the gas turbine in order to increase the power of the gas turbine. By having recourse in this way to devices that are usually present in order to carry out the method, it is possible to implement the method at low cost.

Injecting the liquid into the air sucked in by the compressor leads to the formation of liquid droplets of predeterminable dimensions in said air. As these liquid droplets evaporate before or after entering the compressor, heat is extracted from the air. The air is thereby cooled down, which has an advantageous effect on the cooling capacity that can be obtained with the air.

It is furthermore envisaged, according to the method according to the invention, that the liquid is injected into the sucked-in air in dependence on an air humidity of the sucked-in air, a flow velocity of cooling air flowing in the gas turbine in the region of at least one flow-guiding component, which is to be cooled, of the gas turbine, and a temperature difference between a temperature of the cooling air flowing in the region of the at least one flow-guiding component to be cooled and a temperature of the at least one flow-guiding component of the gas turbine. It is thereby possible to prevent components of the gas turbine, especially thick-walled components thereof, from being damaged by an excessive temperature gradient. From the air humidity of the sucked-in air, the flow velocity of the cooling air and the temperature difference between the temperature of the cooling air flowing in the region of the at least one flow-guiding component to be cooled and the temperature of the at least one flow-guiding component of the gas turbine, it is possible to determine a cooling capacity of the compressor air mass flow, which is used to control the injection of the liquid into the air sucked in by the compressor. In particular, it is possible, on the basis of the respectively determined cooling capacity of the compressor air mass flow, to determine when and at what rate the liquid can be injected into the air sucked in by the compressor to avoid damage to components of the gas turbine by excessive temperature gradients.

As an alternative, likewise in accordance with the method according to the invention, the liquid is injected into the sucked-in air in dependence on an air humidity of the sucked-in air, a flow velocity of cooling air flowing in the gas turbine in the region of at least one flow-guiding component, which is to be cooled, of the gas turbine, and a temperature difference between a temperature of the sucked-in air and a temperature of the at least one flow-guiding component of the gas turbine. By this means too, it is possible to prevent components of the gas turbine, especially thick-walled components thereof, from being damaged by an excessive temperature gradient. From the air humidity of the sucked-in air, the flow velocity of the cooling air and the temperature difference between the temperature of the sucked-in air and the temperature of the at least one flow-guiding component of the gas turbine, it is possible to determine a cooling capacity of the compressor air mass flow, which is used to control the injection of the liquid into the air sucked in by the compressor. In particular, it is possible, on the basis of the respectively determined cooling capacity of the compressor air mass flow, to determine when and at what rate the liquid can be injected into the air sucked in by the compressor to avoid damage to components of the gas turbine by excessive temperature gradients.

Thus, both alternative methods are equivalent to the extent that the respective cooling capacity of the compressor air mass flow can be determined and that damage to components of the gas turbine due to excessive temperature gradients can be prevented.

As an option, an opening cross section of an inlet into the compressor is at least partially enlarged during the cool-down mode by means of appropriate control of adjustable inlet guide vanes. Opening the inlet into the compressor enables the compressor air mass flow to be increased, this being associated with improved cooling of the gas turbine. Adjustable inlet guide vanes are usually present in a gas turbine, and therefore this embodiment can also be implemented at low cost without the need to arrange additional components on the gas turbine for this purpose.

The system according to the invention for cooling down a gas turbine first of all comprises at least one device for injecting a liquid into air sucked in by a compressor of the gas turbine, which device can be arranged upstream of the compressor, and at least one electronic open-loop and/or closed-loop control unit, which can be connected to the device in terms of signal engineering and which is designed to control the device in an appropriate manner in order to inject the liquid into the sucked-in air during a cool-down mode of the gas turbine.

The system is associated in corresponding fashion with the advantages mentioned above with reference to the method. The device for injecting the liquid into the air sucked in by the compressor can be formed by a device which is usually already present, by means of which a liquid can be injected into the air sucked in by the compressor in a power mode of the gas turbine in order to increase the power or efficiency of the gas turbine. By having recourse in this way to devices that are normally already present, it is possible to implement the system at low cost. For example, the device can be designed in such a way that all the liquid droplets formed in the air owing to the injection have already evaporated before entry to the compressor. By means of a device of this kind, "evaporative cooling" of the air can be carried out. As an alternative, the device can be designed in such a way that liquid droplets which form in the air owing to injection also evaporate in the compressor. In such a case, "wet compression" takes place in the compressor. The device can have a plurality of nozzles that can be supplied with liquid by a pump system for injecting the liquid into the air sucked in by the compressor.

The device can be connected to the electronic open-loop and/or closed-loop control unit in a wired or wireless manner in terms of signal engineering. The electronic open-loop and/or closed-loop control unit can be of separate design or can be integrated into an electronic gas-turbine control system.

According to the invention, the system furthermore comprises at least one sensor unit for detecting an air humidity of the sucked-in air, at least one sensor unit for detecting a flow velocity of cooling air flowing in the gas turbine in the region of at least one flow-guiding component, which is to be cooled, of the gas turbine, at least one sensor unit for detecting a temperature of the cooling air flowing in the region of the at least one flow-guiding component to be cooled, and at least one sensor unit for detecting a temperature of the at least one flow-guiding component of the gas turbine, wherein the sensor units can be connected to the electronic open-loop and/or closed-loop control unit in terms of signal engineering, and wherein the electronic open-loop and/or closed-loop control unit is designed to determine a temperature difference between the temperature of the cooling air flowing in the region of the at least one flow-guiding component to be cooled and the temperature of the at least one flow-guiding component of the gas turbine and to control the device in such a way that the liquid can be injected into the sucked-in air in dependence on the respectively detected air humidity of the sucked-in air, the respectively detected flow velocity of the cooling air and the respectively detected temperature difference between the temperature of the cooling air flowing in the region of the at least one flow-guiding component to be cooled and the temperature of the at least one flow-guiding component of the gas turbine. This embodiment is associated in corresponding fashion with the advantages mentioned above with reference to the corresponding embodiments of the method. The air humidity of the sucked-in air, the flow velocity of the cooling air, the temperature of the cooling air flowing in the region of the at least one flow-guiding component to be cooled and the temperature of the at least one flow-guiding component of the gas turbine can be detected and evaluated continuously or at discrete time intervals. As an alternative, provision can be made to detect the flow velocity of the cooling air not by means of a sensor unit but from machine parameters, e.g. the speed of the gas turbine, the fluid pressure in the cooling air in the region of the components of the gas turbine which are to be cooled etc., and from the geometry of the gas turbine, especially of the components thereof which are to be cooled.

As an alternative, the system furthermore comprises, according to the invention, at least one sensor unit for detecting an air humidity of the sucked-in air, at least one sensor unit for detecting a flow velocity of cooling air flowing in the gas turbine in the region of at least one flow-guiding component, which is to be cooled, of the gas turbine, at least one sensor unit for detecting a temperature of the sucked-in air, and at least one sensor unit for detecting a temperature of the at least one flow-guiding component of the gas turbine, wherein the sensor units can be connected to the electronic open-loop and/or closed-loop control unit in terms of signal engineering, and wherein the electronic open-loop and/or closed-loop control unit is designed to determine a temperature difference between the temperature of the sucked-in air and the temperature of the at least one flow-guiding component of the gas turbine and to control the device in such a way that the liquid can be injected into the sucked-in air in dependence on the respectively detected air humidity of the sucked-in air, the respectively detected flow velocity of the cooling air and the respectively detected temperature difference between the temperature of the sucked-in air and the temperature of the at least one flow-guiding component of the gas turbine. This embodiment is associated in corresponding fashion with the advantages mentioned above with reference to the corresponding embodiments of the method. The air humidity of the sucked-in air, the flow velocity of the cooling air, the temperature of the sucked-in air and the temperature of the at least one flow-guiding component of the gas turbine can be detected and evaluated continuously or at discrete time intervals. As an alternative, provision can be made to detect the flow velocity of the cooling air not by means of a sensor unit but from machine parameters, e.g. the speed of the gas turbine, the fluid pressure in the cooling air in the region of the components of the gas turbine which are to be cooled etc., and from the geometry of the gas turbine, especially of the components thereof which are to be cooled.

Thus, both alternative systems are equivalent to the extent that the respective cooling capacity of the compressor air mass flow can be determined and that damage to components of the gas turbine due to excessive temperature gradients can be prevented.

The system advantageously comprises at least one assembly, which can be connected to the electronic open-loop and/or closed-loop control unit in terms of signal engineering, for varying an opening cross section of an inlet into the compressor, which assembly has at least one inlet guide vane ring comprising adjustable inlet guide vanes, wherein the electronic open-loop and/or closed-loop control unit is designed to control the assembly in a manner appropriate to the at least partial enlargement of the opening cross section of the inlet into the compressor during the cool-down mode. This embodiment is associated in corresponding fashion with the advantages mentioned above with reference to the corresponding embodiments of the method. The assembly can be formed by a subassembly that is usually already present on the gas turbine, thereby making it possible to implement this embodiment at low cost.

BRIEF DESCRIPTION OF THE DRAWINGS

The invention is explained by way of example below by means of an embodiment with reference to the attached FIGURE, wherein the features explained below can in each case represent one aspect of the invention taken individually or in various combinations. In the drawing:

FIG. 1 shows a schematic illustration of one illustrative embodiment of a system according to the invention.

DETAILED DESCRIPTION OF INVENTION

FIG. 1 shows a schematic illustration of one illustrative embodiment of a system 1 according to the invention for cooling down a gas turbine 2. The gas turbine 2 comprises a compressor 3, a turbine 4 and a combustion chamber 5, which connects the compressor 3 fluidically to the turbine 4.

The system 1 comprises a device 6, arranged upstream of the compressor 3 of the gas turbine 2, for injecting a liquid into air sucked in by the compressor 3. Moreover, the system 1 comprises an electronic open-loop and/or closed-loop control unit 7, which can be connected to the device 6 in terms of signal engineering by a signal connection S. The electronic open-loop and/or closed-loop control unit 7 is designed to control the device 6 in an appropriate manner in order to inject the liquid into the sucked-in air during a cool-down mode of the gas turbine 2.

The system 1 furthermore comprises at least one sensor unit 8, arranged downstream of the device 6, for detecting an air humidity of the air sucked in by the compressor 3, a sensor unit 9, arranged in the gas turbine 2, for detecting a flow velocity of cooling air flowing in the gas turbine 2 in the region of at least one flow-guiding component (not shown), which is to be cooled, of the gas turbine 2, a sensor unit 10, arranged in the gas turbine 2, for detecting a temperature of the cooling air flowing in the region of the at least one flow-guiding component to be cooled, and a sensor unit 11, arranged in the gas turbine 2, for detecting a temperature of the at least one flow-guiding component of the gas turbine 2. The sensor units 8 to 11 are each connected to the electronic open-loop and/or closed loop control unit 7 in terms of signal engineering by a signal connection S.

The electronic open-loop and/or closed-loop control unit 7 is designed to determine a temperature difference between the temperature of the cooling air flowing in the region of the at least one flow-guiding component to be cooled and the temperature of the at least one flow-guiding component of the gas turbine 2. The electronic open-loop and/or closed-loop control unit 7 is furthermore designed to control the device 6 in such a way that the liquid can be injected into the sucked-in air in dependence on the respectively detected air humidity of the sucked-in air, the respectively detected flow velocity of the cooling air and the respectively detected temperature difference between the temperature of the cooling air flowing in the region of the at least one flow-guiding component to be cooled and the temperature of the at least one flow-guiding component of the gas turbine 2.

The system 1 furthermore comprises an assembly 12, which can be connected to the electronic open-loop and/or closed-loop control unit 7 in terms of signal engineering by a signal connection S, for varying an opening cross section (not shown) of an inlet into the compressor 3. The assembly 12 comprises at least one inlet guide vane ring (not shown) comprising adjustable inlet guide vanes. The electronic open-loop and/or closed-loop control unit 7 is designed to control the assembly 12 in a manner appropriate to the at least partial enlargement of the opening cross section of the inlet into the compressor 3 during the cool-down mode.

Although the invention has been illustrated and described more specifically in detail by means of the preferred illustrative embodiment, the invention is not restricted by the example disclosed, and other variations can be derived therefrom by a person skilled in the art without exceeding the scope of protection of the invention.

The invention claimed is:

1. A method for cooling down a gas turbine, comprising:
running down the gas turbine from a power mode thereof to a cool-down mode, and
injecting a liquid into air sucked in by a compressor of the gas turbine during the cool-down mode,
wherein the liquid is injected into the sucked-in air in dependence on an air humidity of the sucked-in air, a flow velocity of cooling air flowing in the gas turbine in the region of at least one flow-guiding component, which is to be cooled, of the gas turbine, and a temperature difference between a temperature of the cooling air flowing in a region of the at least one flow-guiding component to be cooled and a temperature of the at least one flow-guiding component of the gas turbine.

2. The method as claimed in claim 1,
wherein an opening cross section of an inlet into the compressor is at least partially enlarged during the cool-down mode by means of appropriate control of adjustable inlet guide vanes.

3. A method for cooling down a gas turbine, comprising:
running down the gas turbine from the power mode thereof to a cool-down mode, and
injecting a liquid into air sucked in by a compressor of the gas turbine during the cool-down mode,
wherein the liquid is injected into the sucked-in air in dependence on an air humidity of the sucked-in air, a flow velocity of cooling air flowing in the gas turbine in the region of at least one flow-guiding component, which is to be cooled, of the gas turbine, and a temperature difference between a temperature of the sucked-in air and a temperature of the at least one flow-guiding component of the gas turbine.

4. The method as claimed in claim 3,
wherein an opening cross section of an inlet into the compressor is at least partially enlarged during the cool-down mode by means of appropriate control of adjustable inlet guide vanes.

5. A system for cooling down a gas turbine, having comprising at least one device for injecting a liquid into air sucked in by a compressor of the gas turbine, which device is arranged upstream of the compressor, and at least one electronic open-loop and/or closed-loop control unit connected to the device in terms of signal engineering and configured to control the device in an appropriate manner in order to inject the liquid into the sucked-in air during a cool-down mode of the gas turbine, wherein the system comprises:
  at least one sensor unit for detecting an air humidity of the sucked-in air,
  at least one sensor unit for detecting a flow velocity of cooling air flowing in the gas turbine in the region of at least one flow-guiding component, which is to be cooled, of the gas turbine,
  at least one sensor unit for detecting a temperature of the cooling air flowing in a region of the at least one flow-guiding component to be cooled, and
  at least one sensor unit for detecting a temperature of the at least one flow-guiding component of the gas turbine,
  wherein the sensor units are connected to the electronic open-loop and/or closed-loop control unit in terms of signal engineering, and
  wherein the electronic open-loop and/or closed-loop control unit is configured to determine a temperature difference between the temperature of the cooling air flowing in the region of the at least one flow-guiding component to be cooled and the temperature of the at least one flow-guiding component of the gas turbine and to control the device in such a way that the liquid is injected into the sucked-in air in dependence on the respectively detected air humidity of the sucked-in air, the respectively detected flow velocity of the cooling air and the respectively detected temperature difference between the temperature of the cooling air flowing in the region of the at least one flow-guiding component to be cooled and the temperature of the at least one flow-guiding component of the gas turbine.

6. The system as claimed in claim 5, comprising:
  at least one assembly connected to the electronic open-loop and/or closed-loop control unit in terms of signal engineering, for varying an opening cross section of an inlet into the compressor,
  which assembly has at least one inlet guide vane ring comprising adjustable inlet guide vanes, wherein the electronic open-loop and/or closed-loop control unit is configured to control the assembly in a manner appropriate to the at least partial enlargement of the opening cross section of the inlet into the compressor during the cool-down mode.

7. A system for cooling down a gas turbine, having at least one device for injecting a liquid into air sucked in by a compressor of the gas turbine, which device is arranged upstream of the compressor, and at least one electronic open-loop and/or closed-loop control unit connected to the device in terms of signal engineering and configured to control the device in an appropriate manner in order to inject the liquid into the sucked-in air during a cool-down mode of the gas turbine, wherein the system comprises:
  at least one sensor unit for detecting an air humidity of the sucked-in air,
  at least one sensor unit for detecting a flow velocity of cooling air flowing in the gas turbine in the region of at least one flow-guiding component, which is to be cooled, of the gas turbine,
  at least one sensor unit for detecting a temperature of the sucked-in air, and
  at least one sensor unit for detecting a temperature of the at least one flow-guiding component of the gas turbine,
  wherein the sensor units are connected to the electronic open-loop and/or closed-loop control unit in terms of signal engineering, and wherein the electronic open-loop and/or closed-loop control unit is configured to determine a temperature difference between the temperature of the sucked-in air and the temperature of the at least one flow-guiding component of the gas turbine and to control the device in such a way that the liquid is injected into the sucked-in air in dependence on the respectively detected air humidity of the sucked-in air, the respectively detected flow velocity of the cooling air and the respectively detected temperature difference between the temperature of the sucked-in air and the temperature of the at least one flow-guiding component of the gas turbine.

8. The system as claimed in claim 7, comprising
  at least one assembly connected to the electronic open-loop and/or closed-loop control unit in terms of signal engineering, for varying an opening cross section of an inlet into the compressor,
  which assembly has at least one inlet guide vane ring comprising adjustable inlet guide vanes, wherein the electronic open-loop and/or closed-loop control unit is configured to control the assembly in a manner appropriate to the at least partial enlargement of the opening cross section of the inlet into the compressor during the cool-down mode.

* * * * *